Aug. 30, 1927.

E. K. KÜHN 1,640,454

ATTACHMENT FOR HANDLE BARS

Filed Feb. 19, 1926

WITNESS:
Gust Hjelm

INVENTOR:
E. K. Kühn
BY
H. J. Sanders
ATTORNEY.

Patented Aug. 30, 1927.

1,640,454

UNITED STATES PATENT OFFICE.

ERNST KARL KÜHN, OF DELHI, ILLINOIS.

ATTACHMENT FOR HANDLEBARS.

Application filed February 19, 1926. Serial No. 89,379.

This invention relates to improvements in attachments for handle bars of bicycles or motorcycles and more particularly to a spring attachment which acts as a shock absorber. Simplicity in construction, efficiency in use and durability are objects attained.

With the foregoing and other objects in view the invention consists in the combination and arrangement of parts to be hereinafter fully described, pointed out in the appended claims and illustrated in the accompanying drawing which forms a part of this application and in which—

Like reference characters denote corresponding parts throughout the several views.

Figure 1:
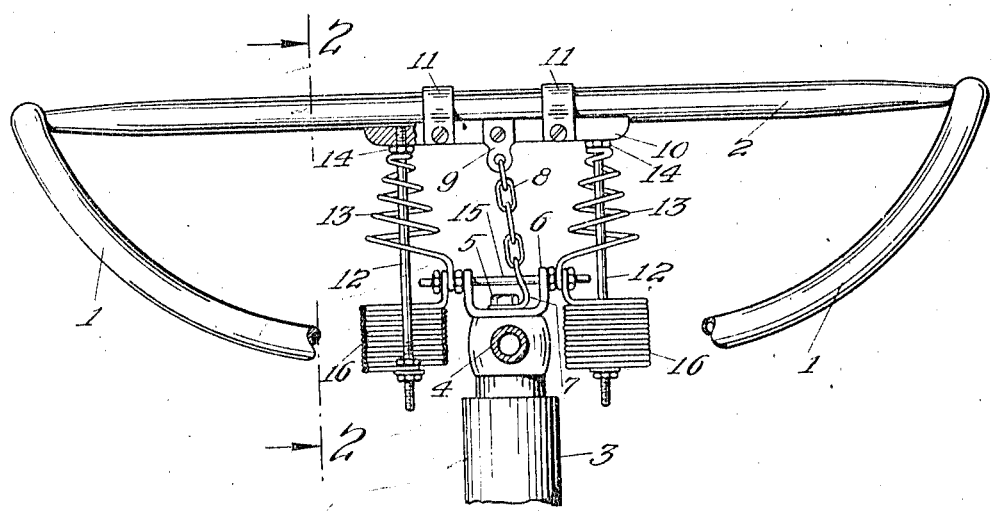
Fig. 1 is a front view of the attachment, partly in section, illustrating its application, and it is taken on line 1—1 of Fig. 2.
Figure 2:
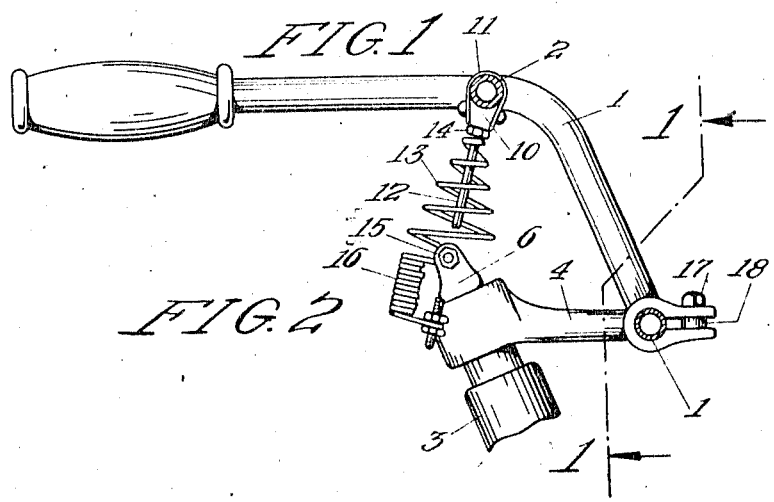
Fig. 2 is a side view and is taken on line 2—2 of Fig. 1.
Figure 3:
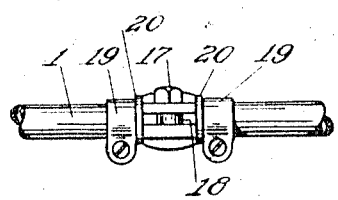
Fig. 3 is a fragmentary view of the device illustrating the method of applying it to the base of the handle-bar.

The reference numeral 1 denotes the handle-bars comprising the cross bar 2, and 3 denotes the steering post to which the head 4 is secured by the usual bolt having the nut 5 at its upper end. Upon the steering post bolt I provide a U-plate 6 and a link 7, both of said members being retained in position by the said nut 5; said link 7 being connected by a chain 8 to another link 9 that is carried by a bar 10 secured by metal straps 11 to the said cross bar 2.

To the bar 10, at the ends thereof, the parallel threaded rods 12 are secured and about each rod 12 is a coil spring 13, one end of each spring abutting a nut 14 arranged upon the inner end of its rod 12, the other end of the spring being secured to a rod 15 carried by the U-plate 6 and disposed at right angles to said rods 12 and between the same. To the said rod 15 spring coils 16 are secured also, said coils encircling the aforesaid rods 12 and being secured thereto at one end.

Ordinarily the handle-bars are secured to the head 4 by a nut 17 which is so tightened upon the bifurcated end of the head 4 that relative movement of the handle-bars is prevented. I prefer, however, to so loosen this nut 17 that a washer 18 can be disposed thereupon between the prongs of the head 4. This will permit movement of the handle-bars upon the head 4 as a pivot in a vertical plane. To prevent lateral movement of the handle-bars I provide clamp collars 19 provided with ears 20 arranged upon opposite sides of the head.

Vibration of the handle-bars incident to travel over rough roads will now be minimized and the shock absorbed by the expansion springs 13 and coils 16. Extreme movement of the handle-bars about the head 4 will be prevented by the chain 8 that is connected to the steering post bolt and to the bar 10 which is fast to the cross bar 2.

What is claimed is:—

1. In combination, a steering post, a pair of handle bars connected to the steering post and capable of vertical rotatable movement with respect to the steering post, a cross bar connected to the handle bars, means secured to the cross bar to limit in one direction the vertical movement of the handle bars, a pair of threaded rods associated with said cross bar, a third rod rigidly carried by the steering post and disposed at right angles to said threaded rods, coil springs connecting said threaded rods and the third rod, and spring coils connecting said threaded rods and said third rod, said spring coils being arranged upon the opposite side of said third rod with relation to said coil springs.

2. In combination, a steering post, a pair of handle bars connected to the steering post and capable of vertical rotatable movement with respect to the steering post, a cross bar connected to the handle bars, means secured to the cross bar to limit in one direction the vertical movement of the handle bars, a pair of parallel threaded rods rigidly carried by said bar, a third rod rigidly carried by the steering post and disposed at right angles to said threaded rods and between the same, coil springs connecting said threaded rods and the third rod, and spring coils connecting said threaded rods and said third rod, said spring coils being arranged upon the opposite side of said third rod with respect to said coil springs.

In testimony that I claim the foregoing as my own I have hereto affixed my signature.

ERNST KARL KÜHN.